US006490773B1

(12) United States Patent
Estes et al.

(10) Patent No.: US 6,490,773 B1

(45) Date of Patent: Dec. 10, 2002

(54) SETTING TOOL FOR NAIL-IN ANCHORS

(75) Inventors: John Howard Estes, Spring, TX (US); Johnnie Wayne Painter, Sr., Conroe, TX (US)

(73) Assignee: Matrix Tool, Inc., Spring, TX (US)

( * ) Notice: Subject to any disclaimer, the term of this patent is extended or adjusted under 35 U.S.C. 154(b) by 0 days.

(21) Appl. No.: 09/896,464

(22) Filed: Jun. 29, 2001

(51) Int. Cl.[7] ................................................ B23B 45/16

(52) U.S. Cl. ......................................................... 29/275

(58) Field of Search .......................... 29/275, 255, 254, 29/270, 263

(56) References Cited

U.S. PATENT DOCUMENTS

| | | | | |
|---|---|---|---|---|
| 4,627,140 A | | 12/1986 | Davis | |
| 4,637,539 A | | 1/1987 | Turcott et al. | |
| 4,867,249 A | * | 9/1989 | Watkins et al. | 173/132 |
| 4,890,779 A | | 1/1990 | Giannuzzi | |
| 4,899,431 A | * | 2/1990 | Borntrager | 29/244 |
| 5,439,338 A | | 8/1995 | Rosenberg | |
| 5,979,913 A | | 11/1999 | Kosik et al. | |
| 5,991,996 A | * | 11/1999 | Leverette | 29/275 |

* cited by examiner

*Primary Examiner*—Robert C. Watson
(74) *Attorney, Agent, or Firm*—Mary J. Gaskin

(57) ABSTRACT

A tool for driving and setting a nail-in anchor into concrete. The tool has a drive pin which can be locked and unlocked. When the drive pin is locked, the tool, used with a hammer, will drive only the anchor sleeve into a pre-drilled hole in concrete. When the drive pin is then unlocked, the tool, again used with a hammer, will nail the nail into the sleeve and set the anchor. The tool can be manipulated using only one hand. The tool typically has a thumb cap which, when rotated, locks and unlocks the drive pin. The tip of the tool is machined to have a concave shape for fitting over the convex-shaped dome of a typical nail-in anchor. The outer surfaces of the tool can have knurls to improve handling.

7 Claims, 6 Drawing Sheets

SETTING TOOL FOR NAIL-IN ANCHORS

FIELD OF THE INVENTION

The present invention relates to a setting tool for a nail-in anchor. The tool is used to drive the anchor sleeve into a pre-drilled hole; then the same tool is easily rotated for nailing in the nail and setting the anchor.

BACKGROUND OF THE INVENTION

Concrete nail-in anchors are widely used in the construction industry. A nail-in anchor has an anchor sleeve topped by a convex-shaped crown or dome. A nail is inserted into the sleeve through a hole in the dome. A hole is drilled in the concrete or brickwork. The anchor sleeve is inserted through a mounting hole in a structural piece (or through an opening in an angle iron bracket, etc.) and hammered into the hole in the concrete. Finally, the nail is driven into the sleeve, forming a wedge and setting the anchor.

Presently, the tools used for driving and setting a nail-in anchor can be inefficient and even ineffective. Typically, a series of tools must be utilized. A drill is used to make the hole in the concrete. A hammer and/or screwdriver is used to hammer the anchor sleeve into the hole so that the dome rests on the surface of the concrete. A driving tool, such as a screwdriver, chisel, or center punch, and a hammer are then used to drive in the nail and set the anchor. The tools presently used can be difficult to align in order to hammer the anchor sleeve into the hole and may damage the dome of the anchor, which is often made from soft metal.

Having to then switch a different tool for driving the nail requires re-alignment, wasting time and causing the installer to lose his focus. When dozens of anchors must be set, the expenditure of time can be substantial. When used to drive in the nail, the presently-available tools may cause the nail to bend to one side and can even cause the nail head to chip off. Anchors may not be properly set, resulting in a poor result, both structurally and cosmetically. In hard-to-reach places, the installer using presently-available tools has little room to hammer in an anchor; in such circumstances, the anchor is likely to fail.

SUMMARY OF THE INVENTION

The present invention provides a setting tool for nail-in anchors which overcomes the problems of the prior art. The tool is designed so that novices can use it. The tool is safe and comfortable to use. It eliminates the need to switch from one tool to another, thereby saving time.

The installer grips the body of the tool with one hand. The tool of the present invention has a concave milled end which fits over the dome of an anchor sleeve. The outer surfaces of the tool are knurled, to improve handling. In its locked position, the pin, or shaft, of the tool cannot move. Using a hammer or mallet held in his other hand, the installer strikes the exposed end of the locked pin, and the body of the tool drives the anchor until its dome rests against the surface of the material in which it is to be anchored. Without changing the position of the tool, using his thumb, the installer rotates the latch cap in a counter-clockwise direction, unlocking the pin of the tool so that it can move freely up and down within the body of the tool. When the exposed end of the unlocked pin is then struck with a hammer, the tool will drive in the nail and set the anchor.

The tool can be used without damaging the anchors and the surface of the object being anchored. The installer is able to stay completely focused on installing each anchor. Finally, Installation of each anchor takes considerably less time than does the process using presently-available tools.

It is an object of the present invention to provide a tool which is safe and comfortable to use.

Another object of the present invention is to provide a tool which is easy to use, regardless of an installer's experience.

Still another object of the present invention is to provide a tool which allows the installer to install nail-in anchors using focused, efficient movements.

Yet another object of the present invention is to provide a tool which shortens the amount of time required to install each anchor.

A further object of the present invention is to provide a tool with two positions, the first position for driving in the body of an anchor, and the second position for driving in and setting the nail of the anchor; changing from the first position to the second position can accomplished without realigning the tool.

A still further object of the present invention is to provide a tool which can be used without damaging either the anchors or the surfaces of the material to be anchored.

BRIEF DESCRIPTION OF THE DRAWINGS

FIG. 5B is a side plan view of the pin inside the latch after a nail-in anchor has been set and the nail driven in.

DESCRIPTION OF THE PREFERRED EMBODIMENT

Figure 1:
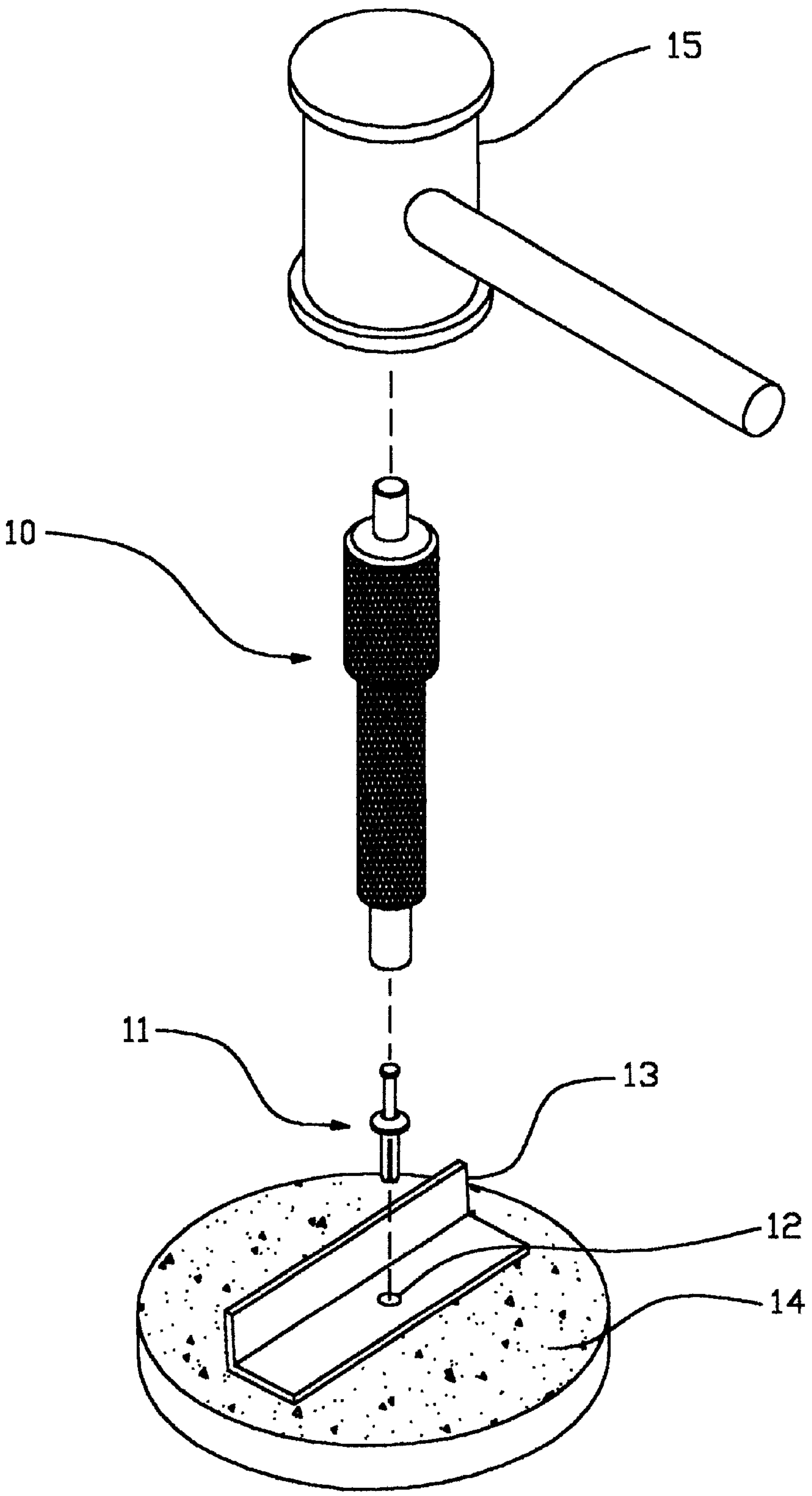
FIG. 1 is a front perspective view of the tool of the present invention aligned with the head of a mallet and a nail-in anchor, before anchoring an angle iron bracket to a concrete block.

As shown in FIG. 1, the nail-in anchor setting tool 10 of the present invention is used with a mallet 15 to drive a nail-in anchor 11 through a hole 12 in an angle iron bracket 13 and into a drilled hole in a concrete block 14; the anchor setting tool 10 is then used to set the nail-in anchor 11 in the concrete block 14, thereby attaching the angle iron bracket 13 firmly against the surface of the concrete block 14.

Figure 2A:
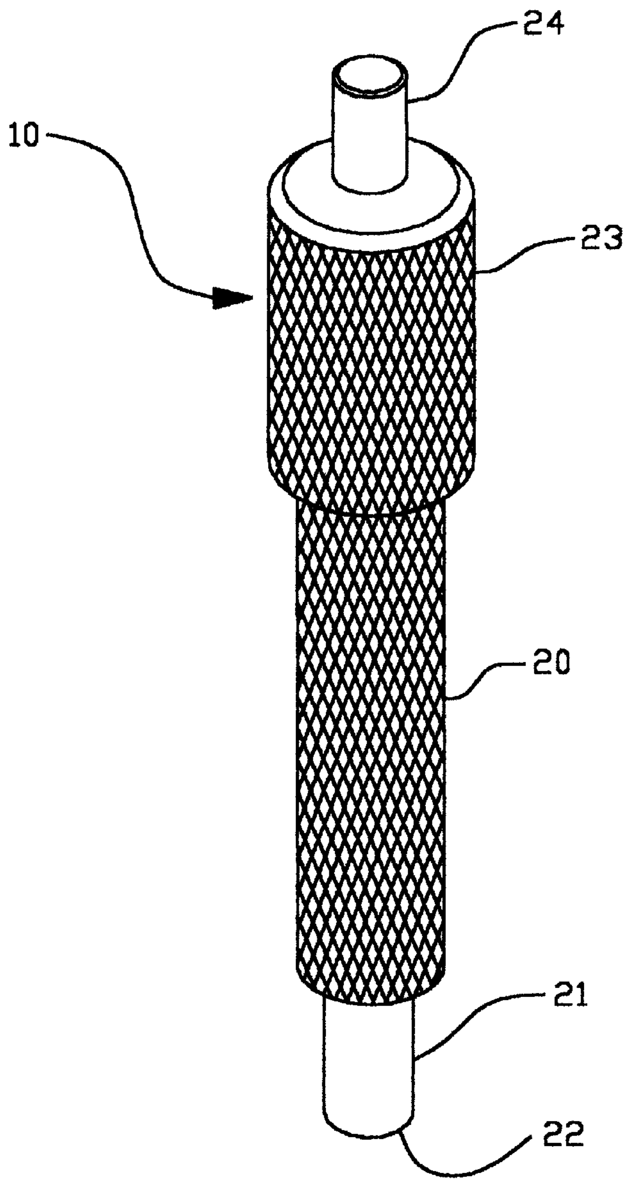
FIG. 2A is an enlarged side perspective view of the tool of the present invention.

FIG. 2A shows the assembled nail-in anchor setting tool 10. The body 20, which serves as the hand grip, is made from a corrosion-resistant, hard metal such as aluminum. It has a knurled surface to prevent slippage of the tool 10. The body 20 has a narrow tip 21 which can be used in tight areas, such as the one hole conduit strap, widely used in the electrical industry. The tip 21 is machined to have a concave end 22, which fits over the convex portion of the nail-in anchor 11. Because of the design, use of the tool 10 will not damage the convex-shaped dome of the nail-in anchor 11. The latch cap 23 (also called a thumb cap), is also made from a corrosion-resistant, hard metal such as aluminum, and has a knurled surface. The drive pin 24, protruding through the top of the latch cap 23, is made from heat-treated steel. The drive pin 24 is machined to slide into the bore of the body 20 and through the tip 21 until its end is even with the concave end 22 of the body 20.

Figure 2B:
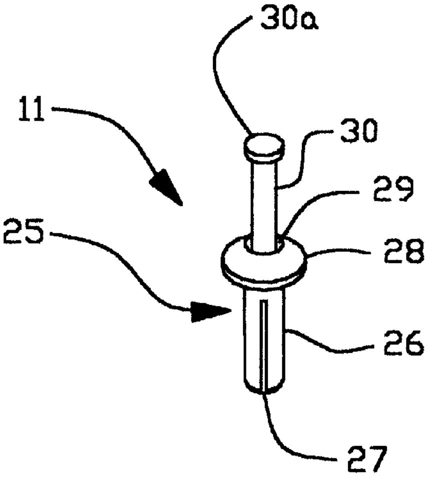
FIG. 2B is an enlarged side perspective view of a nail-in anchor.

FIG. 2B shows a typical nail-in anchor 11 for use with concrete or masonry. Such anchors come in different sizes, and include metallics, curries, dotties and zamacs. Typically, each nail-in anchor 11 has an anchor sleeve 25 with chamfered ends 26 separated by a longitudinal slot 27. Atop the anchor sleeve 25 is a convex-shaped dome 28 with a circular groove 29 around a central opening for entry of the nail 30. The circular groove 29 is shaped to accommodate the head 30*a* of the nail 30, so that it is flush with the top of the convex-shaped dome 28 after installation.

Figure 3:
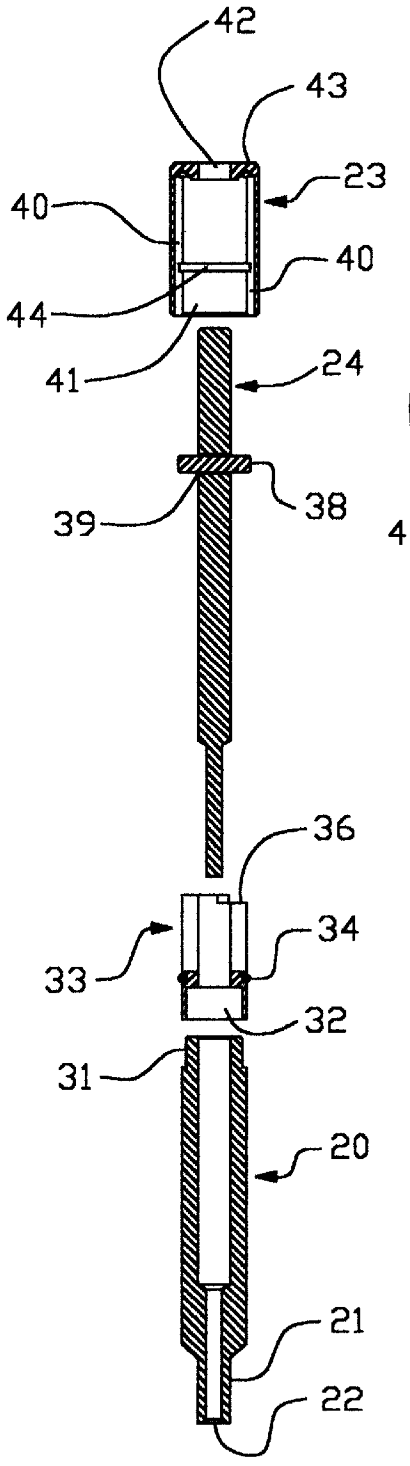
FIG. 3 is an exploded sectional side view of the parts of the tool of the present invention.

FIG. 3 shows the parts of the tool 10 prior to assembly. In FIG. 3, the upper end 31 of the body 20 is pressed into the bore of the lower end 32 of the latch 33, which is made from heat-treated steel. Alternatively, the surface of the upper end 31 of the body 20 has threads, and the bore of the lower end 32 of the latch 33 has complementary threads, so the upper end 31 of the body 20 can be threaded into the bore of the lower end 32 of the latch 33. The latch 33 has an O-ring 34, made from a material such as Buna-N with a Durometer such as 75, which is pressed into an O-ring groove 35 (see FIGS. 3B and 3C). The latch 33 is machined to have two notches 36 spaced 180° apart and to have a longitudinal slot 37 through both sides of the latch 33.

A dowel pin 38, made from tool steel, has been pressed or floated into a pre-drilled hole 39 in the drive pin 24. The dowel pin 38 allows the drive pin 24 to lock or unlock from the latch 33. The drive pin 24 is inserted into the bore of the body 20. When the tool 10 is going to be used, the ends of the dowel pin 38 will rest against the notches 36 on the latch 33 (the drive pin's 24 locked position), and the installer will use the body 20 to drive the anchor sleeve 25 into place. The installer will then rotate the latch cap 23, which will rotate the drive pin 24, thereby aligning the dowel pin 38 with the slot 37 on the latch 33 (the drive pin's 24 unlocked position). The installer will then use the drive pin 24 to drive in the nail 30 (the dowel pin 38 will slide down into the slot 37 as the nail 30 is driven in).

When the tool 10 is assembled, the ends of the dowel pin 38 fit into complementary dowel pin grooves 40 in the bore 41 of the latch cap 23, which is slid over the latch 33. With the ends of the dowel pin 38 in the slot 37, the latch cap 23 is moved downward, and the end of the drive pin 24 fitted through the hole 42 in the top 43 of the latch cap 23. The latch cap 23 is then pressed further downward until the O-ring 34 on the latch 33 engages the receiving groove 44 on the bore 41 of the latch cap 23, locking the tool 10 together in its final assembled position. After the tool 10 is assembled, rotation of the latch cap 23 will rotate the latch 33 as well.

Figure 3A:
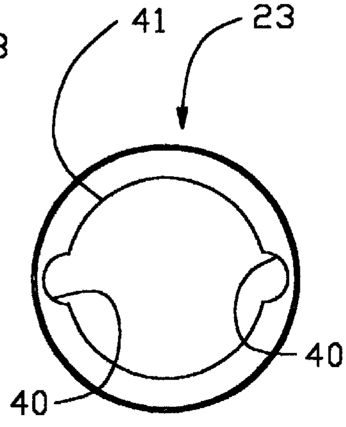
FIG. 3A is an end view of the bottom of the latch cap of the tool of the present invention.

FIG. 3A shows more clearly the dowel pin grooves 40 on the bore 41 of the latch cap 23. The dowel pin grooves 40 accommodate the ends of the dowel pin 38 on the drive pin 24, allowing it to slide up and down.

Figure 3B:
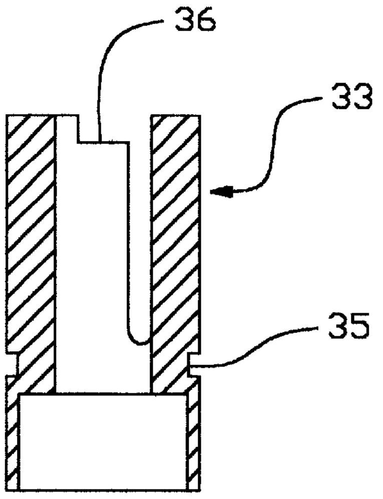
FIG. 3B is an enlarged sectional view of the latch rotated 50° clockwise from FIG. 3.

FIG. 3B shows the latch 33 rotated 50° clockwise from the view in FIG. 3. The ends of the dowel pin 38 will rest on the notches 36 on the latch 33 when the drive pin 24 is "locked".

Figure 3C:
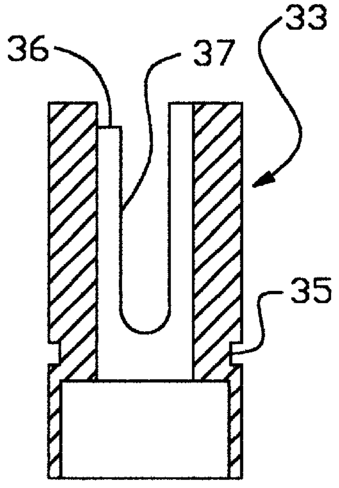
FIG. 3C is an enlarged sectional view of the latch rotated 90° counter-clockwise from FIG. 3.

FIG. 3C shows the latch 33 rotated 90° counter-clockwise from the view in FIG. 3. The ends of the dowel pin 38 can move up and down in the slot 37, with the drive pin 24 in an unlocked position.

Figure 3D:
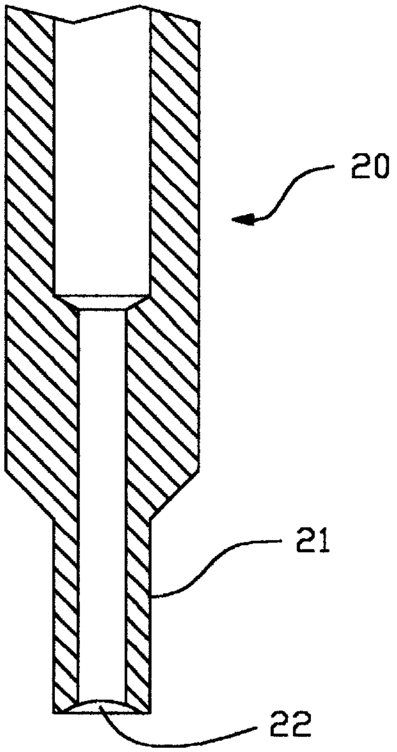
FIG. 3D is a partial sectional side view of the lower portion of the body of the tool of the present invention.

FIG. 3D is an enlarged view of the lower portion of the body 20, showing more clearly the milled concave end 22 of the tip 21, which fits over the convex-shaped dome 28 of each nail-in anchor 11.

FIGS. 4 and 5 show more clearly the movement of the drive pin 24 within the latch 33.

Figure 4A:
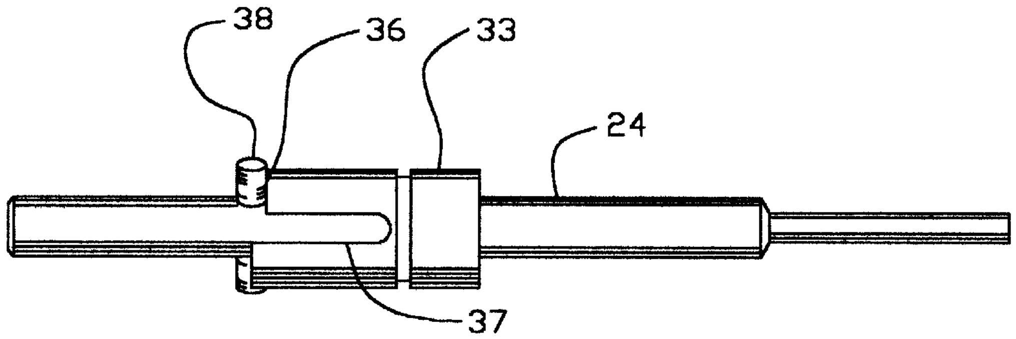
FIG. 4A is a side plan view of the pin in a locked position inside the latch.
Figure 4B:
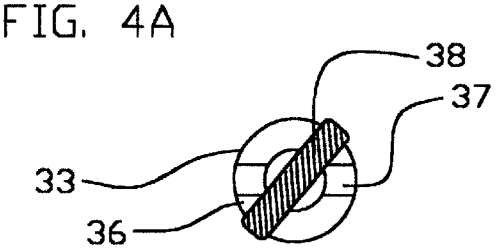
FIG. 4B is a sectional top view of the pin in a locked position inside the latch.

In FIG. 4A, the drive pin 24 is in its locked position. The ends of the dowel pin 38 rest against the notches 36 on the latch 33. FIG. 4B is a top sectional view of the ends of the dowel pin 38 resting against the notches 36 on the latch 33.

Figure 5A:
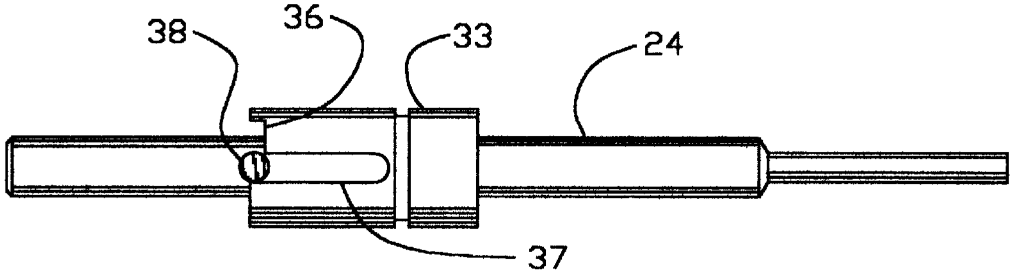
FIG. 5A is a side plan view of the pin in an unlocked position inside the latch.
Figure 5B:
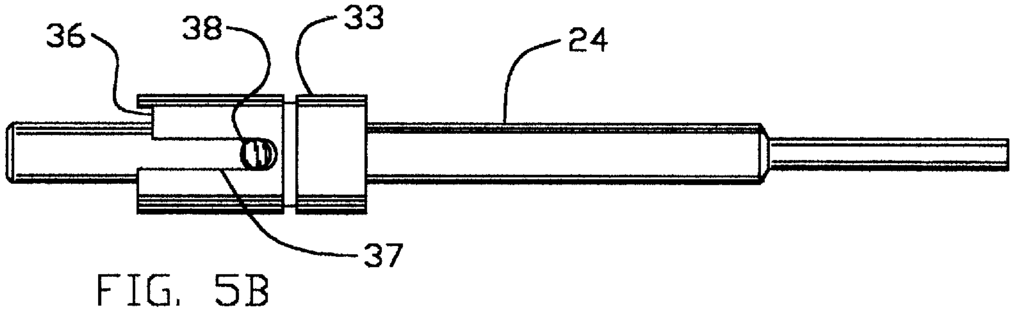

In FIG. 5A, the drill pin is in its unlocked position. The dowel pin 38 has been rotated counter-clockwise approximately 50°, off the notches 36 and into the slot 37 in the latch 33. In FIG. 5B, the dowel pin 38 has moved to the bottom of the slot 37, the position it would have after a nail 11 has been nailed in.

Figure 5C:
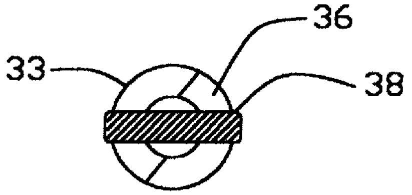
FIG. 5C is a sectional top view of the pin in an unlocked position inside the latch.

FIG. 5C is a top sectional view of the drive pin 24 in the unlocked position, showing the ends of the dowel pin 38 in the slot 37 in the latch 33.

Figure 6A:
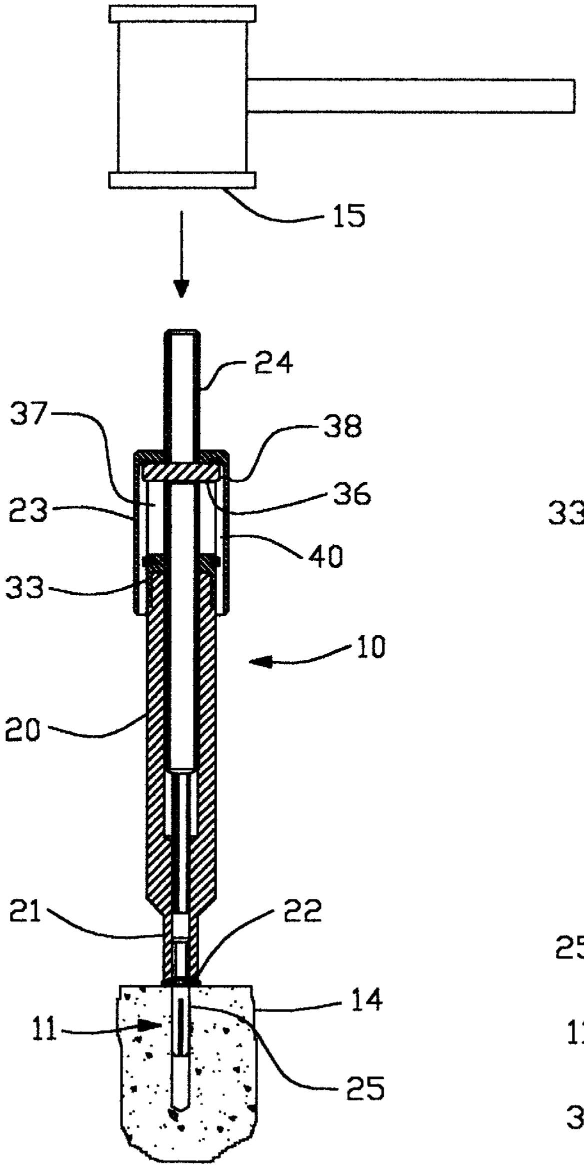
FIG. 6A is a sectional side view of the tool as it is used to drive in the body of a nail-in anchor.
Figure 6B:
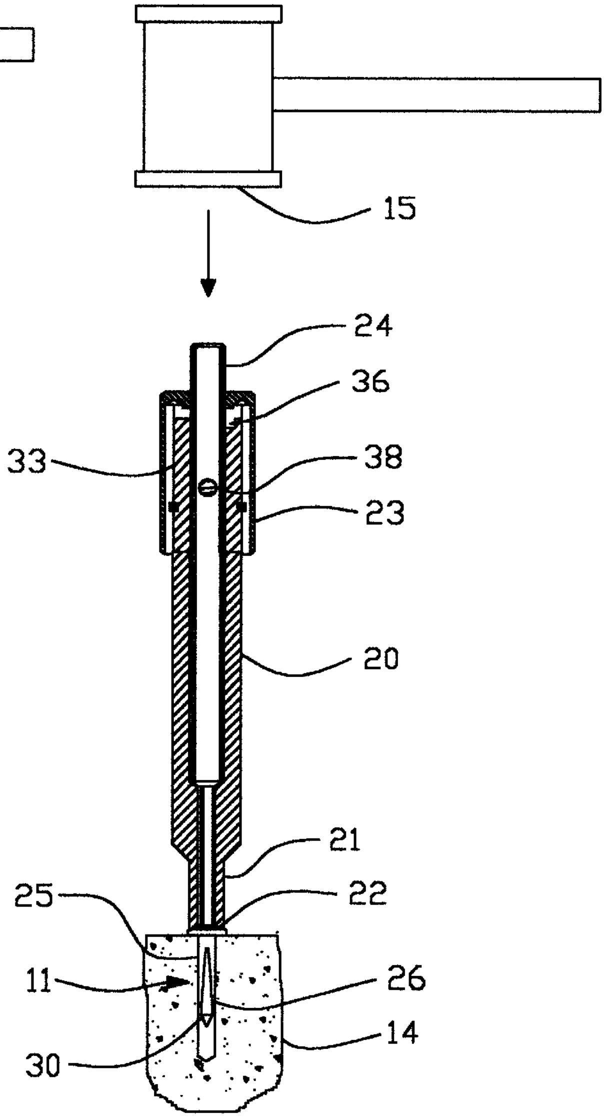
FIG. 6B is a cross-sectional side view of the tool as it is used to drive in the nail of a nail-in anchor.

FIGS. 6A and 6B show sectional views of the tool 10 in use.

In FIG. 6A, the tool 10 is in a "locked" position, with the dowel pin 38 resting on the notches 36 on the latch 33. The concave end 22 of the tip 21 of the body 20 fits over the convex-shaped dome 28 of the nail-in anchor 11. The installer uses the mallet 15 to hit the locked drive pin 24, which transfers the driving force to the body 20, which drives in the anchor sleeve 25.

In FIG. 6B, the tool 10 is in an "unlocked" position, with the dowel pin 38 in the slot 37 of the latch 33. The installer uses the mallet 15 to hit the unlocked drive pin 24, directly driving the nail 30 into the anchor sleeve 25, driving apart the chamfered ends 26 of the nail-in anchor 11.

FIGS. 7A through 7E show plan views of the tool 10 in use.

Figures 7A, 7B, 7C, 7D, 7E:
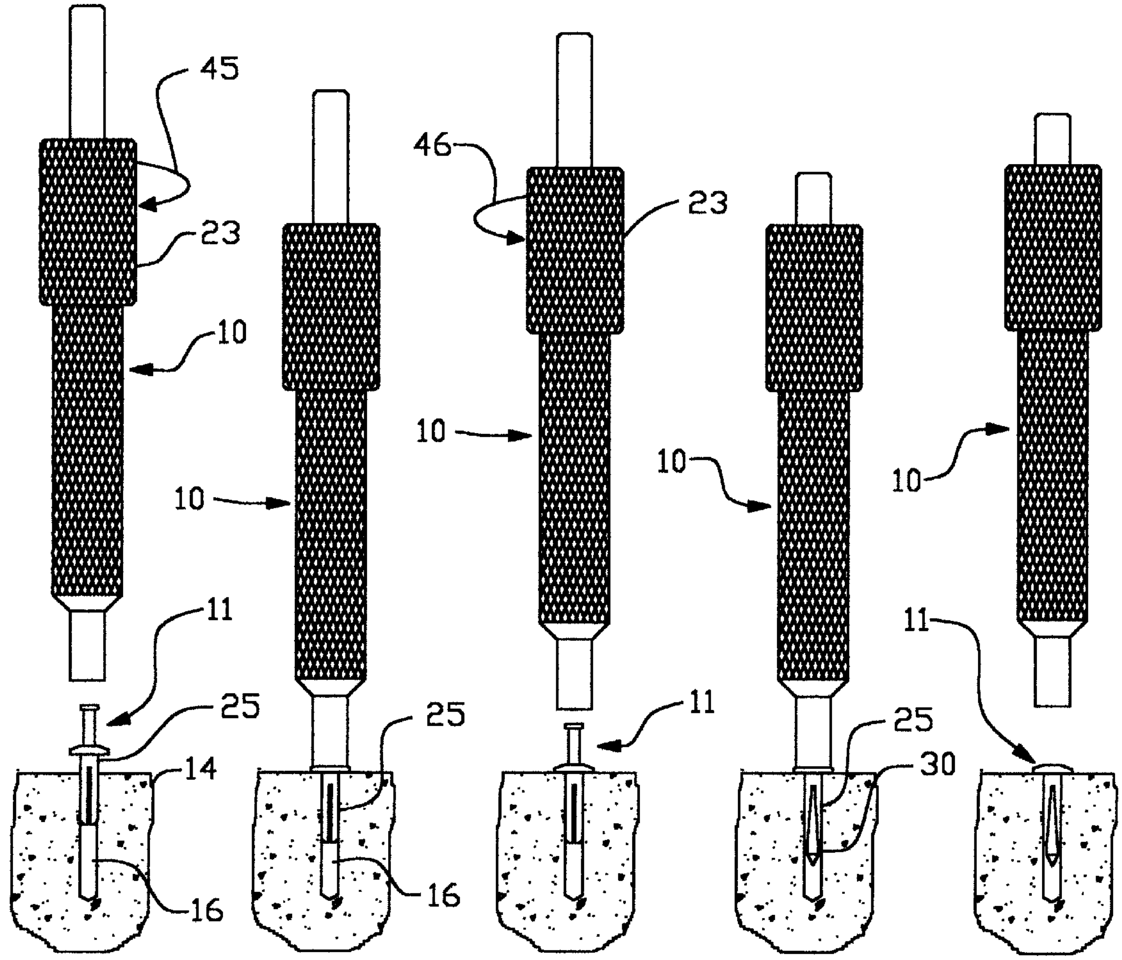
FIGS. 7A through 7E are side plan views of the positions of the tool as it is used to install a nail-in anchor, showing the rotation of the latch cap to lock and unlock the pin of the tool.

In FIG. 7A, the latch cap 23 of the tool 10 is rotated clockwise 45 into its locked position. The anchor sleeve 25 of a nail-in anchor 11 has been partially inserted into a drilled masonry hole 16 in a concrete block 14.

In FIG. 7B, the locked tool 10 has driven the anchor sleeve 25 into the drilled masonry hole 16.

In FIG. 7C, the tool 10 is shown lifted up (in use, it does not need to be lifted away from the nail-in anchor 11), and the latch cap 23 is rotated counter-clockwise 46 into an unlocked position.

In FIG. 7D, the tool 10 has driven the nail into the anchor sleeve 25.

In FIG. 7E, installation is complete, and the tool 10 has been lifted away from the nail-in anchor 11.

We claim:

1. A setting tool, for use with a hammer, for driving and nailing an anchor assembly into concrete, said tool comprising:

an elongated cylindrical body member having a bore, a driving end, and a connection end;

a drive pin having a nailing end and an impact end, the nailing end of the drive pin being inserted into the bore of the body member in axial alignment;

means for locking and unlocking the drive pin, said means being attached to the connection end of the body member;

a cylindrical thumb cap having a bore, an inner surface, a top end with a hole and an open bottom end which fits over the drive pin and the means for locking and unlocking the drive pin, the impact end of the drive pin protruding through the hole in the top end of the thumb cap;

means for attaching the thumb cap to the means for locking and unlocking the drive pin.

2. The setting tool of claim 1, wherein the means for locking and unlocking the drive pin comprises:

a locking pin inserted through an opening in the drive pin, said locking pin extending perpendicularly from the drive pin;

a cylindrical latching member having an outer surface, a bore, a connection end, and a latching end with at least one notch and at least one longitudinal slot, the connection end of said latching member being attached to the connection end of the body member; and at least one longitudinal groove on the inner surface of the thumb cap, the groove holding the locking pin;

the means further comprising rotational movement of the thumb cap, which causes the drive pin to rotate between a locked position and an unlocked position, the drive pin being locked when the locking pin rests in the notch on the latching member, and the drive pin being unlocked when the locking pin is positioned in the slot on the latching member.

3. The setting tool of claim 2, wherein the means for attaching the thumb cap to the means for locking and unlocking the drive pin comprises an annular groove on the outer surface of the latching member, an annular groove on the inner surface of the thumb cap and an O-ring disposed in both grooves, said O-ring frictionally engaging the thumb cap to the latching member.

4. The setting tool of claim 2, wherein the connection end of the body member comprises a male end and wherein the connection end of the latching member comprises a female end complementary to the male end.

5. The setting tool of claim 1, wherein the anchor assembly has a convex-shaped dome and the driving end of the body member has been machined to have a concave-shaped tip.

6. The setting tool of claim 1, wherein the body member and the thumb cap are made from corrosion-resistant aluminum, and the drive pin and the latching member are made from heat-treated steel.

7. The setting tool of claim 1 wherein both the body member and the thumb cap have outer surfaces with knurls machined thereon.

* * * * *